United States Patent
Warner et al.

(10) Patent No.: US 8,258,664 B2
(45) Date of Patent: Sep. 4, 2012

(54) PERMANENT MAGNET SYNCHRONOUS MOTOR AND DRIVE SYSTEM

(75) Inventors: Justin D. Warner, York, PA (US); Ivan Jadric, York, PA (US); Michael S. Todd, Jacobus, PA (US); Zhiqiao Wu, York, PA (US); Shreesha Adiga Manoor, York, PA (US); Konstantin Borisov, York, PA (US); Scott Victor Slothower, Dillsburg, PA (US); Kanishk Dubey, York, PA (US); John C. Hansen, Spring Grove, PA (US)

(73) Assignee: Johnson Controls Technology Company, Holland, MI (US)

( * ) Notice: Subject to any disclaimer, the term of this patent is extended or adjusted under 35 U.S.C. 154(b) by 595 days.

(21) Appl. No.: 12/572,947

(22) Filed: Oct. 2, 2009

(65) Prior Publication Data

US 2010/0084935 A1    Apr. 8, 2010

Related U.S. Application Data

(60) Provisional application No. 61/102,687, filed on Oct. 3, 2008.

(51) Int. Cl.
*H02K 21/00* (2006.01)
(52) U.S. Cl. .............. 310/112; 310/165.15; 310/156.21; 310/216.137
(58) Field of Classification Search ............. 310/156.15, 310/156.21, 112, 216.137
See application file for complete search history.

(56) References Cited

U.S. PATENT DOCUMENTS

| | | | |
|---|---|---|---|
| 3,593,103 A | 7/1971 | Chandler et al. |
| 3,621,366 A | 11/1971 | Duff et al. |
| 4,308,491 A | 12/1981 | Joyner, Jr. et al. |
| 4,587,474 A | 5/1986 | Espelage et al. |
| 4,697,131 A | 9/1987 | Schauder et al. |

(Continued)

FOREIGN PATENT DOCUMENTS

EP    0272776 A2    6/1988

(Continued)

OTHER PUBLICATIONS

Silicon Carbide npnp Thyristors, John H. Glenn Research Center, Cleveland, Ohio, downloaded from http://www.nasatech.com/Briefs/Dec00/LEW16750.html on Jan. 20, 2004, 3 pages.

(Continued)

*Primary Examiner* — Quyen Leung
*Assistant Examiner* — David Scheuermann
(74) *Attorney, Agent, or Firm* — McNees Wallace & Nurick LLC

(57) ABSTRACT

A hybrid motor for powering a compressor of a chiller system includes a first rotor portion and a first stator portion configured as a permanent magnet motor and a second rotor portion and a second stator portion configured as a reluctance motor. The second rotor portion includes a reluctance-type rotor, and the second stator portion includes electromagnetic windings capable of inducing a rotary magnetic field. The first rotor portion and the second rotor portion are attached to a common drive shaft. The reluctance motor is arranged to generate start-up torque and initiate rotation of the drive shaft until the drive shaft achieves a predetermined rotational speed. The permanent magnet motor is arranged to power the drive shaft between the predetermined rotational speed and a maximum rotational speed.

21 Claims, 5 Drawing Sheets

U.S. PATENT DOCUMENTS

| | | |
|---|---|---|
| 4,758,771 A | 7/1988 | Saito et al. |
| 4,761,726 A | 8/1988 | Brown |
| 4,864,483 A | 9/1989 | Divan |
| 4,959,602 A | 9/1990 | Scott et al. |
| 5,038,267 A | 8/1991 | De Donker et al. |
| 5,081,368 A | 1/1992 | West |
| 5,123,080 A | 6/1992 | Gillett et al. |
| 5,127,085 A | 6/1992 | Becker et al. |
| 5,237,737 A * | 8/1993 | Zigler et al. ............... 29/598 |
| 5,298,848 A | 3/1994 | Ueda et al. |
| 5,410,230 A | 4/1995 | Bessler et al. |
| 5,483,142 A | 1/1996 | Skibinski et al. |
| 5,499,178 A | 3/1996 | Mohan et al. |
| 5,570,279 A | 10/1996 | Venkataramanan |
| 5,592,058 A | 1/1997 | Archer et al. |
| 5,625,549 A | 4/1997 | Horvat |
| 5,646,458 A | 7/1997 | Bowyer et al. |
| 5,747,955 A | 5/1998 | Rotunda et al. |
| 5,757,599 A | 5/1998 | Crane |
| 5,796,234 A | 8/1998 | Vrionis |
| 5,869,946 A | 2/1999 | Carobolante |
| 5,889,667 A | 3/1999 | Bernet |
| 5,909,367 A | 6/1999 | Change |
| 5,936,855 A | 8/1999 | Salmon |
| 5,969,966 A | 10/1999 | Sawa et al. |
| 6,005,362 A | 12/1999 | Enjeti et al. |
| 6,050,083 A | 4/2000 | Meckler |
| 6,072,302 A | 6/2000 | Underwood et al. |
| 6,118,676 A | 9/2000 | Divan et al. |
| 6,160,722 A | 12/2000 | Thommes et al. |
| 6,163,472 A | 12/2000 | Colby |
| 6,239,513 B1 | 5/2001 | Dean et al. |
| 6,276,148 B1 | 8/2001 | Shaw |
| 6,313,600 B1 | 11/2001 | Hammond et al. |
| 6,348,775 B1 | 2/2002 | Edelson et al. |
| 6,407,937 B2 | 6/2002 | Bruckmann et al. |
| 6,487,096 B1 | 11/2002 | Gilbreth et al. |
| 6,507,503 B2 | 1/2003 | Norrga |
| 6,559,562 B1 | 5/2003 | Rostron |
| 6,566,764 B2 | 5/2003 | Rebsdorf et al. |
| 6,603,675 B1 | 8/2003 | Norrga |
| 6,625,046 B2 | 9/2003 | Geissler |
| 6,657,874 B2 | 12/2003 | Yu |
| 6,658,870 B1 | 12/2003 | Jenkins |
| 6,686,718 B2 | 2/2004 | Jadric et al. |
| 6,704,182 B2 | 3/2004 | Bruckmann et al. |
| 6,768,284 B2 | 7/2004 | Lee et al. |
| 6,801,019 B2 | 10/2004 | Haydock et al. |
| 7,005,829 B2 | 2/2006 | Schnetzka |
| 7,034,500 B2 * | 4/2006 | Ionel ............... 318/772 |
| 7,081,734 B1 | 7/2006 | Jadric et al. |
| 7,116,066 B2 | 10/2006 | Lin |
| 7,135,828 B2 | 11/2006 | Lin |
| 7,408,312 B2 | 8/2008 | Itou et al. |
| 7,411,329 B2 | 8/2008 | Murakami et al. |
| 7,555,912 B2 | 7/2009 | Schnetzka et al. |
| 2002/0176261 A1 | 11/2002 | Norrga |
| 2003/0015873 A1 | 1/2003 | Khalizadeh et al. |
| 2003/0052544 A1 | 3/2003 | Yamamoto et al. |
| 2003/0133317 A1 | 7/2003 | Norrga |
| 2003/0168919 A1 | 9/2003 | Friedrichs et al. |
| 2003/0231518 A1 | 12/2003 | Peng |
| 2004/0008005 A1 | 1/2004 | Sakai et al. |
| 2004/0012986 A1 | 1/2004 | Riggio et al. |
| 2005/0057210 A1 | 3/2005 | Ueda et al. |
| 2005/0068001 A1 | 3/2005 | Skaug et al. |
| 2005/0190511 A1 | 9/2005 | Crane et al. |
| 2006/0208685 A1 | 9/2006 | Schnetzka |
| 2007/0063668 A1 | 3/2007 | Schnetzka et al. |

FOREIGN PATENT DOCUMENTS

| | | |
|---|---|---|
| EP | 0283954 A2 | 9/1988 |
| EP | 0313366 A2 | 4/1989 |
| EP | 0422221 A1 | 11/1989 |
| EP | 1300937 A2 | 4/2003 |
| JP | 4026374 | 1/1992 |
| JP | 6105563 | 9/1992 |
| JP | 5068376 | 3/1993 |
| JP | 2002176767 | 6/2002 |
| WO | 9314559 A1 | 7/1993 |
| WO | 9732168 A1 | 9/1997 |
| WO | 2004098038 A1 | 11/2004 |

OTHER PUBLICATIONS

IGBT with Reverse Blocking Capability, IXYS Semiconductor GmbH, 2003, pp. 1-2.

Ahmed Elasser and T. Paul Chow, Silicon Carbide Benefits and Advantages for Power Electronics Circuits and Systems, Proceedings of the IEEE, vol. 90, No. 6, Jun. 2002, pp. 969-986.

M. Takei, T. Naito and K. Ueno, The Reverse Blocking IGBT for Matrix Converter with Ultra-Thin Wafer Technology, 4 pages.

Klumpner C. et al; "Using Reverse Blocking IGBTs in Power Converters for Adjustable Speed Drives", Conference Record of the 2003 IEEE Industry applications Conference 38th IAS Annual Meeting, Salt Lake City, UT, Oct. 12-16, 2003, vol. 3 of 3 Conf. 38, pp. 1516-1523 USA.

Ozipineci B. et al.: "4H-SiC GTO Thyristor and p-n. Diode Loss Models for HVDC Converter", Industry Applications Conference 2004, 39th IAS Annual Meeting, conference record of the 2004 IEEE Seattle, WA USA, Oct. 2004, Vol, 2, pp. 1238-1243.

Jue Wang et al.: "Evaluation of High-Voltage 4H-SiC Switching Devices" IEEE Transactions on Electron Devices, IEEE Service Center, Piscataway, NJ, vol. 46, No. 3, Mar. 1999.

Annabelle Van Zyl, Rene Spee, Alex Faveluke, and Shibashis Bhowmik; Voltange Sag Ride-Through for Adjustable-Speed Drives With Active Rectifiers; Nov./Dec. 1998; vol. 34, Issue No. 6; IEEE Transactions on Industry Applications.

Annette Von Jouanne, Prasad N. Enjeti, and Basudeb Banerjee; Assessment of Ride-Through Alternatives for Adjustable-Speed Drives; Jul./Aug. 1999; vol. 35, Issue No. 4; IEEE Transactions on Industry Applications.

Morimoto et al.: "Expansion of Operating Limits for Permanent Magnet Motor by Current Vector Control Considering Inverter Capacity", IEEE Transactions on Industry Applications, vol. 26, Issue No. 5, Sep./Oct. 1990.

Libor Prokop and Pavel Grasblum, "3-Phase PM Synchronous Motor Vector Control Using a 56F80x, 56F8100, or 56F8300 Device", Freescale Semiconductor: Application Note, AN1931, Rev. 3, Jan. 2005.

* cited by examiner

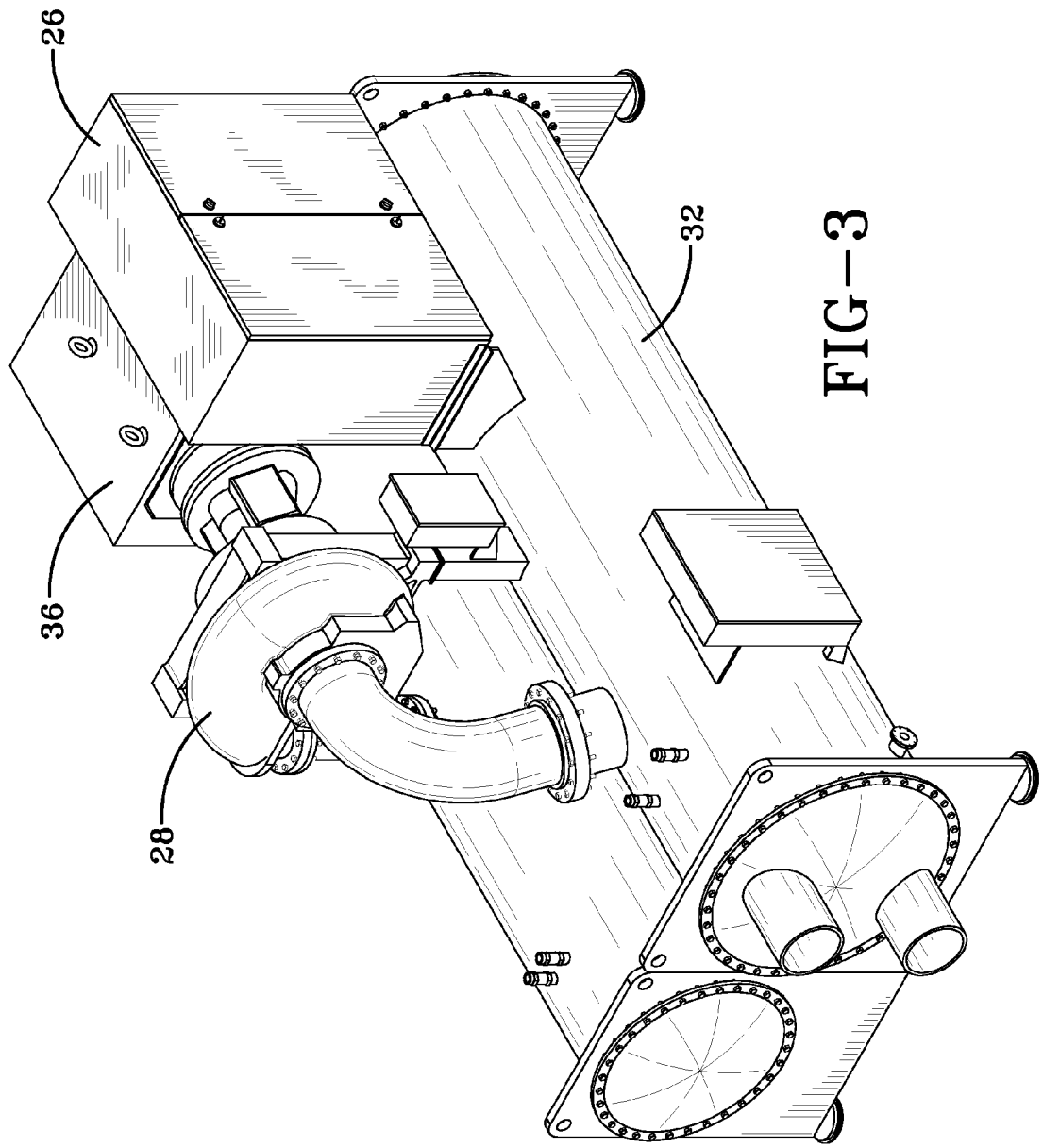

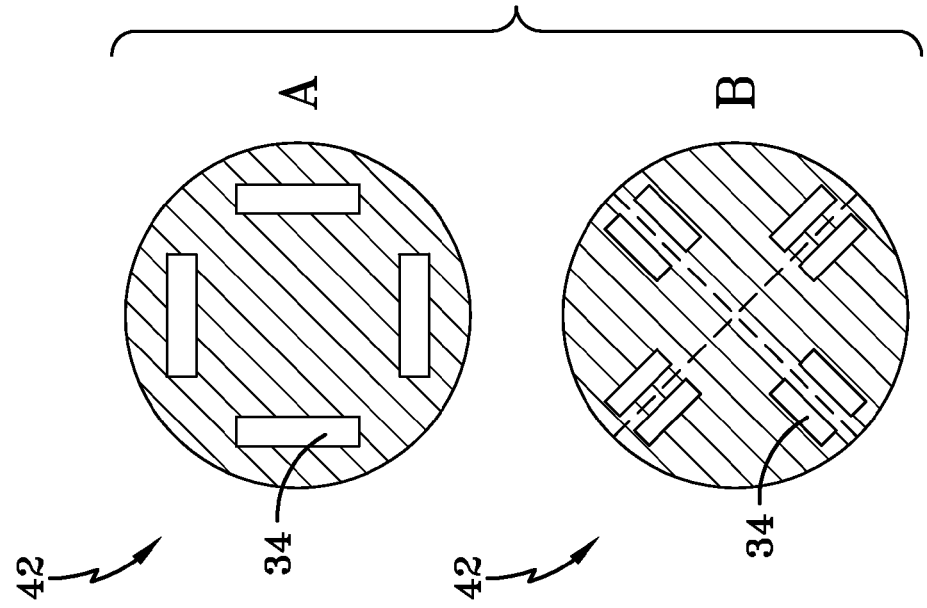
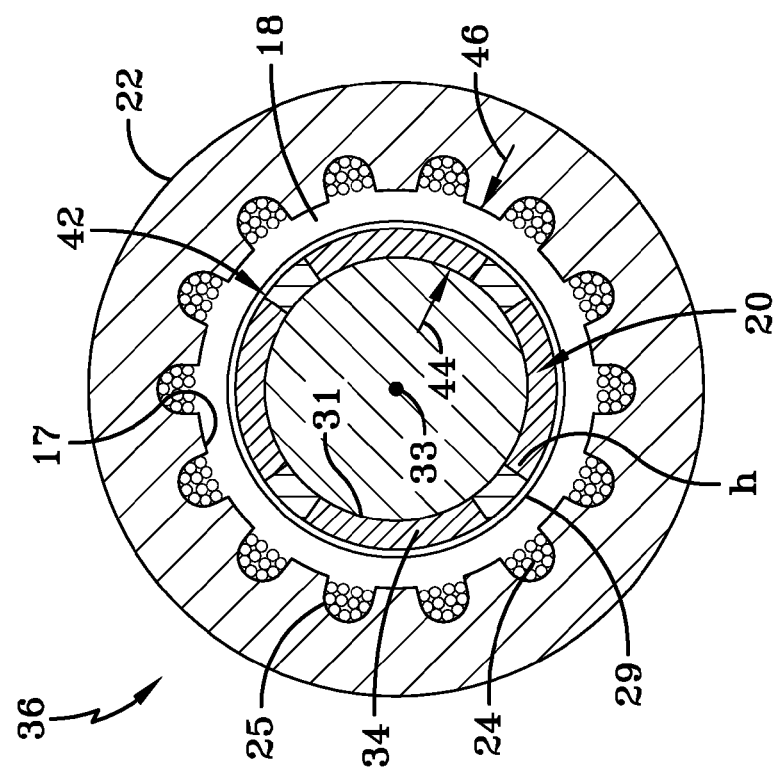
FIG-5
FIG-4

PERMANENT MAGNET SYNCHRONOUS MOTOR AND DRIVE SYSTEM

This patent application claims the benefit of U.S. Provisional Patent Application No. 61/102,687, filed Oct. 3, 2008, entitled PERMANENT MAGNET MOTOR DRIVE AND CONTROLLER, for which priority is claimed and the disclosure of which is hereby incorporated by reference.

BACKGROUND

The application generally relates to a permanent magnet motor drive. The application relates more specifically to a variable speed drive (VSD) for controlling a permanent magnet motor that powers a compressor in heating, ventilation, air conditioning and refrigeration (HVAC&R) system.

Currently VSDs are used to power a variety of motor types in HVAC&R systems. Common types of motors that are used for HVAC&R applications include induction motors, switched reluctance motors, and other synchronous and DC motors capable of handling the torque and speed ranges in such HVAC&R systems.

Permanent magnet synchronous motors (PMSM) are of particular interest for use as traction motors in electric vehicle designs due to their higher efficiency and higher power density as compared to regular DC motors and AC induction motors. PMSM motors typically operate with a permanent magnet rotor. A permanent magnet rotor may be configured with surface mounted permanent magnets or with interior permanent magnets having different arrangements. PMSM 36 is a rotating electric machine in which the stator might be similar to a stator of an induction motor and the rotor has surface-mounted or interior permanent magnets. However, a totally different stator design for a PMSM is possible and a stator design optimization is necessary even though the stator topology might be similar to an induction machine. The use of a permanent magnet to generate a substantial air gap magnetic flux makes it possible to design highly efficient PMSMs.

A PMSM that is driven by a sinusoidal current is referred to as a PMSM while, a PMSM that is driven by a rectangular 120° electrical phase-current waveform is can be referred to as a brushless dc (BLDC) machine. The rotor structure of the PMSM and BLDC might be the same such as surface-mounted permanent magnet rotor. Both the PMSM and BLDC are driven by currents coupled with the given rotor position. The angle between the generated stator flux linkage and the rotor flux linkage, which is generated by a rotor magnet, defines the torque, and thus speed, of the motor. Both the magnitude of the stator flux linkage and the angle between the stator flux linkage and rotor flux linkage are controllable to maximize the torque or minimize the losses. To maximize the performance of PMSM and ensure the system stability, the motor requires a power electronics converter for proper operation.

For a three-phase PMSM, a standard three-phase power output stage is used, which is the same power stage that is used for AC induction motors. The power stage utilizes six power transistors with independent switching. The power transistors are switched in the complementary mode. The fundamental sine wave output is generated using a PWM technique.

For a three-phase PMSM, a standard three-phase power output stage is used, which is the same power stage that is used for AC induction motors. The power stage utilizes six power transistors with independent switching. The power transistors are switched in the complementary mode. The fundamental sine wave output is generated using a PWM technique.

Heretofore PMSM motors and their associated VSDs have been limited in their application in commercial and industrial scale HVAC&R systems, largely due to factors relating to relatively low performance requirements from old HVAC&R systems, higher system cost, and complicated control system design.

SUMMARY

The present invention is directed to, a chiller system includes a compressor, a condenser and an evaporator connected in a closed refrigerant loop. A hybrid motor connected to the compressor to power the compressor. The hybrid motor is includes a first rotor portion and a first stator portion configured as a permanent magnet motor and a second rotor portion and a second stator portion configured as a reluctance motor. The second rotor portion includes a reluctance-type rotor, and the second stator portion includes electromagnetic windings capable of inducing a rotary magnetic field. The first rotor portion and the second rotor portion are attached to a common drive shaft. The reluctance motor is arranged to generate start-up torque and initiate rotation of the drive shaft until the drive shaft achieves a predetermined rotational speed. The permanent magnet motor is arranged to power the drive shaft between the predetermined rotational speed and a maximum rotational speed.

The present invention also relates to, a hybrid motor for powering a compressor of a chiller system including a first rotor portion and a first stator portion configured as a permanent magnet motor and a second rotor portion and a second stator portion configured as a reluctance motor. The second rotor portion includes a reluctance-type rotor, and the second stator portion includes electromagnetic windings capable of inducing a rotary magnetic field. The first rotor portion and the second rotor portion are attached to a common drive shaft. The reluctance motor is arranged to generate start-up torque and initiate rotation of the drive shaft until the drive shaft achieves a predetermined rotational speed. The permanent magnet motor is arranged to power the drive shaft between the predetermined rotational speed and a maximum rotational speed.

BRIEF DESCRIPTION OF THE FIGURES

FIG. 3 shows an exemplary embodiment of a variable speed drive (VSD) mounted on a vapor compression system.

FIG. 4 is an exemplary schematic diagram of a permanent magnet synchronous motor.

FIG. 5 is an exemplary schematic diagram of the rotor of an internal PMSM (IPM).

DETAILED DESCRIPTION OF THE EXEMPLARY EMBODIMENTS

Figure 1:
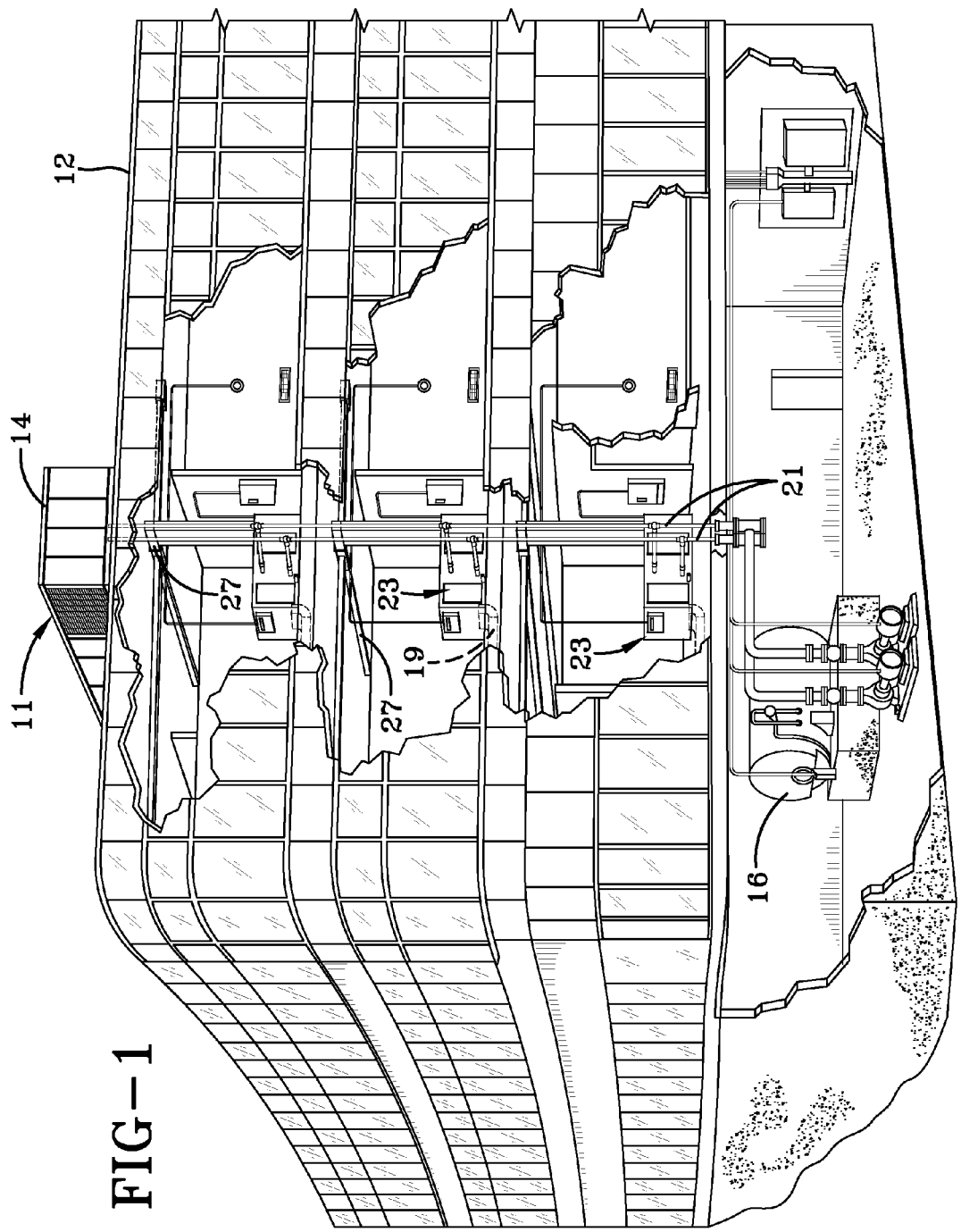
FIG. 1 shows an exemplary embodiment of a Heating, Ventilation, Air Conditioning and Refrigeration (HVAC&R) system in a commercial environment.

FIG. 1 shows an exemplary environment for a Heating, Ventilating, Air Conditioning system (HVAC system) 11 in a building 12 for a commercial setting. HVAC system 11 may include a compressor incorporated into a vapor compression system 14 that can supply a chilled liquid that may be used to cool building 12. HVAC system 11 can also include a boiler 16 used to heat building 12, and an air distribution system that circulates air through building 12. The air distribution system can include an air return duct 19, an air supply duct 27 and an air handler 23. Air handler 23 can include a heat exchanger that is connected to boiler 16 and vapor compression system 14 by conduits 21. The heat exchanger in air handler 23 may receive either heated liquid from boiler 16 or chilled liquid from vapor compression system 14, depending on the mode of operation of HVAC system 11. HVAC system 11 is shown with a separate air handler on each floor of building 12, but it will be appreciated that these components may be shared between or among floors.

Figure 2:
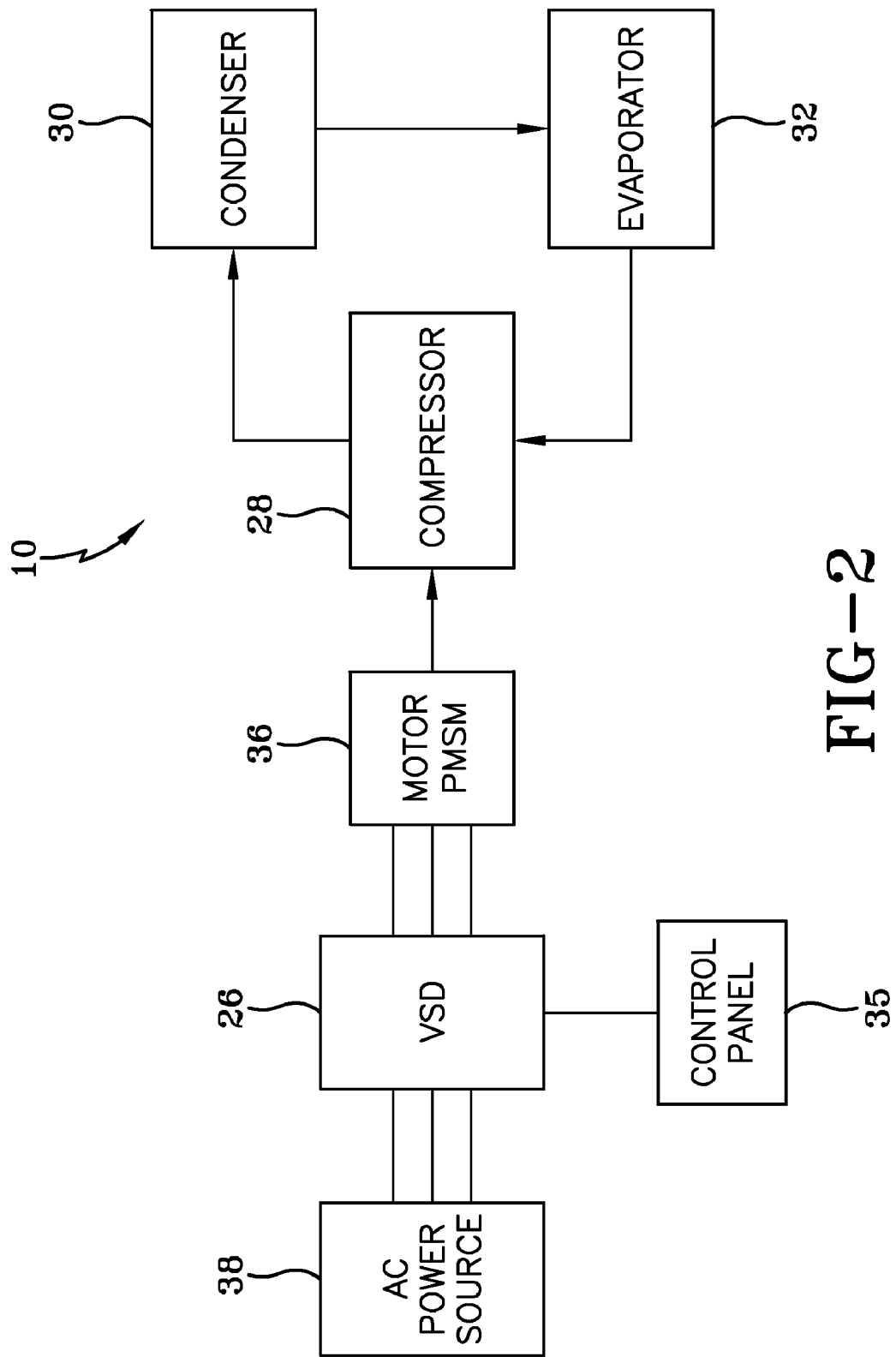
FIG. 2 schematically illustrates an exemplary embodiment of vapor compression system that may be used in the exemplary embodiment of FIG. 1.

FIG. 2 illustrates generally an exemplary configuration of a vapor compression system 14 with a variable speed drive (VSD) 26 that may be used in building 12 in FIG. 1. An AC power source 38 supplies AC power to VSD 26, which in turn, supplies AC power to a motor, for example, PMSM 36. In another embodiment, VSD 26 can power more than one motor. PMSM 36 is used to drive a corresponding compressor 28 of vapor compression system 14. Vapor compression system 14 includes compressor 28, a condenser 30, a water chiller or evaporator 32, and a control panel 35. The compressor 28, condenser 30 and evaporator 32 are connected in a closed refrigerant loop. AC power source 38 provides single phase or multi-phase (e.g., three phase), fixed voltage, and fixed frequency AC power to VSD 26 from an AC power grid or distribution system that is present at a site. AC power source 38 can supply a three phase AC voltage or nominal line voltage of 200 V, 230 V, 380 V, 460 V, or 600 V, at a nominal line frequency of 50 Hz or 60 Hz to VSD 26 depending on the corresponding AC power grid. It is to be understood that AC power source 38 can provide any suitable fixed nominal line voltage or fixed nominal line frequency to VSD 26 depending on the configuration of the AC power grid. In addition, a particular site can have multiple AC power grids that can satisfy different line voltage and line frequency requirements. For example, a site may have a 230 VAC power grid to handle certain applications and a 460 VAC power grid to handle other applications.

VSD 26 receives AC power having a particular fixed line voltage and fixed line frequency from AC power source and provides AC power to PMSM 36 at a desired voltage and desired frequency, both of which can be varied to satisfy particular requirements. VSD 26 may include the ability to provide AC power to the PMSM 36 having higher voltages and frequencies or lower voltages and frequencies than the fixed voltage and fixed frequency received from AC power source 38. PMSM 36 may have a predetermined rated voltage and frequency that is greater than the fixed AC input voltage and frequency, however the rated motor voltage and frequency may also be equal to or lower than the fixed AC input voltage and frequency.

VSD 26 may be, for example, a vector-type drive or a variable-voltage, variable frequency (VVVF) drive. Control panel 35 can include a variety of different components, such as an analog to digital (A/D) converter, a microprocessor, a non-volatile memory, and an interface board, to control operation of system 14. Control panel 35 can also be used to control the operation of VSD 26, and motor 36.

Compressor 28 compresses a refrigerant vapor and delivers the vapor to condenser 30 through a discharge line. Compressor 28 can be, for example, a screw compressor, a centrifugal compressor, a reciprocating compressor, a scroll compressor, or any other suitable type of compressor. The refrigerant vapor delivered by compressor 28 to condenser 30 enters into a heat exchange relationship with a fluid, for example, air or water, and undergoes a phase change to a refrigerant liquid as a result of the heat exchange relationship with the fluid. The condensed liquid refrigerant from condenser 30 flows through an expansion device (not shown) to evaporator 32.

Evaporator 32 may include connections for a supply line and a return line of a cooling load. A process fluid, for example, water, ethylene glycol, calcium chloride brine or sodium chloride brine, travels into evaporator 32 via return line and exits evaporator 32 via supply line. The liquid refrigerant in evaporator 32 enters into a heat exchange relationship with the process fluid to lower the temperature of the process fluid. The refrigerant liquid in evaporator 32 undergoes a phase change to a refrigerant vapor as a result of the heat exchange relationship with the process fluid. The vapor refrigerant in evaporator 32 exits evaporator 32 and returns to compressor 28 by a suction line to complete the cycle.

FIG. 3 shows an exemplary vapor compression system of an HVAC&R system. The VSD 26 can be mounted on top of the evaporator 32, and adjacent to motor 36. Motor 36 may be mounted on condenser 30 on the opposite side of evaporator 32. Output wiring (not shown) from VSD 26 is connected to motor leads (not shown) for motor 36, to power motor 36, which drives compressor 28.

Referring to FIG. 4, an exemplary PMSM 36 includes a stator portion 22. The stator portion 22 can be configured substantially similar to a stator of a conventional induction motor. Stator portion 22 includes a plurality of windings 24 disposed in slots 25 defined by a plurality of teeth 17, symmetrically distributed about an inside radius of stator portion 22 adjacent to a rotor portion 20. Rotor portion 20 is disposed axially concentrically with and inside stator portion 22, rotor portion 20 and stator portion 22 separated by an air gap 18. Rotor portion 20 may include a cylindrical steel rotor frame or cage 31 with a plurality of permanent magnets 34 arranged peripherally on rotor cage 31. Permanent magnets 34 produce a magnetic field in air gap 18.

Permanent magnets 34 may be arranged to provide multiple pole arrangements, for example 2-pole or 4-pole, in rotor portion 20. Permanent magnets 34 may be adhesively affixed to cage 32, and are enveloped by a sleeve 29 to maintain permanent magnets 34 on cage 31 when centrifugal forces act on rotor portion 20 during rotation of PMSM 36. Sleeve 29 may be constructed of carbon fiber tubular sheet material, stainless steel or other similarly flexible, high strength, magnetically non-permeable material. Air gap 18 is small relative to an effective air gap g shown between opposing arrows 44, 46. Effective air gap g includes the height h of permanent magnets 34 and sleeve 29.

In another exemplary embodiment, PMSM 36 may be configured as an internal permanent magnet motor (IPM). FIG. 5 illustrates schematically an exemplary IPM rotor 42. The IPM 42 includes permanent magnets 34 implanted within rotor portion 20, rather than being mounted on the surface of rotor portion 20.

For starting PMSM 36, it is necessary to determine the position of a q-axis and a d-axis of the rotor portion 20 within an angular sector of about 60°. The q-axis and a d-axis positions can be determined using a position sensor (not shown) on rotor portion 20. Placement of a position sensor on rotor portion 20 may require a complete disassembly of the PMSM 36 in the event of a sensor failure.

Figure 6:
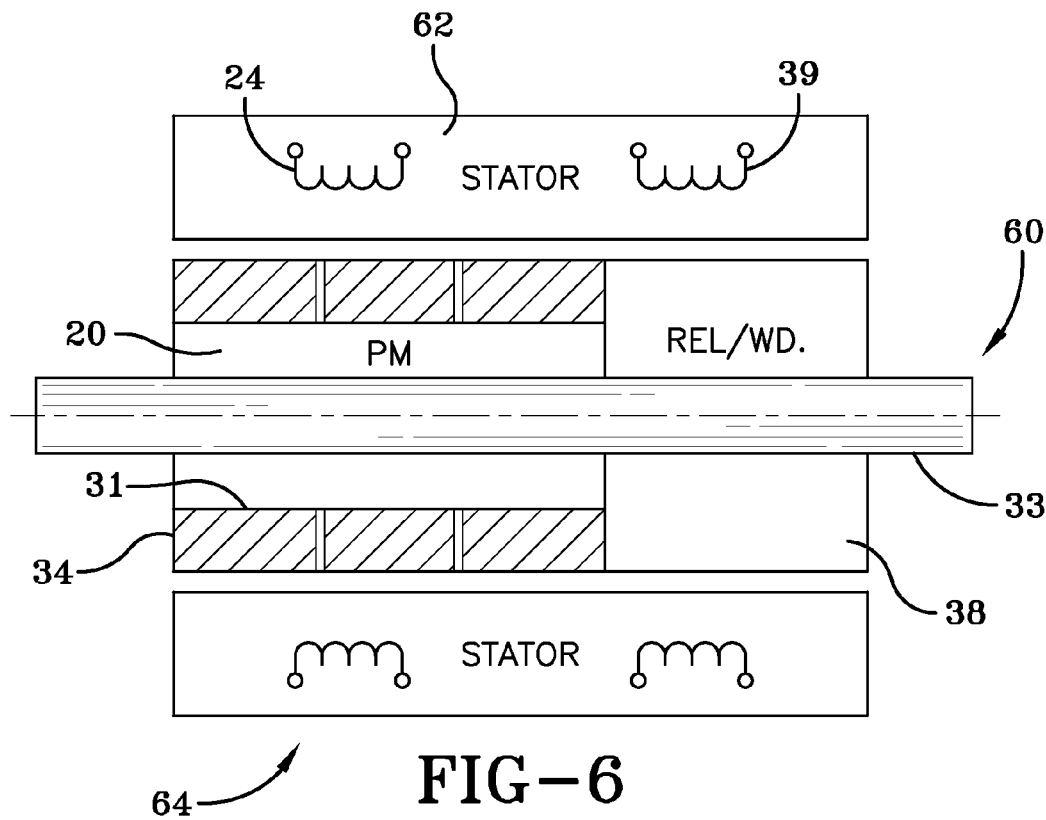
FIG. 6 shows a hybrid rotor structure composed of a permanent magnet rotor and a conventional synchronous reluctance rotor.

Referring to FIG. 6, a hybrid PMSM rotor 60 including permanent magnets 34 and rotor cage 31, similar to rotor portion 20 described above, is arranged on the same shaft as a conventional reluctance rotor 38 for a reluctance-type motor, with corresponding stator windings 39 on stator portion 62. The reluctance-type rotor 38 provides high power density at low-cost, and may be rated at significantly lower power than PMSM rotor portion 20. Reluctance rotor 38 is provided for start-up hybrid of PMSM 64, to provide start-up torque and initiate rotation of hybrid PMSM 64, and to begin turning shaft 33 of hybrid PMSM 64 up to a predetermined rotational speed, for example, fifteen revolutions per minute (RPM), at which point control panel 35 may determine the magnetic flux axes (q-axis, d-axis) without the need for an internal sensor mounted on hybrid rotor 60. Once hybrid PMSM 64 reaches the predetermined rotational speed, control panel 35 assumes control of hybrid PMSM 64, to power hybrid PMSM 64 to maximum rotational speed or to any speed between the predetermined rotational speed and maximum rotational speed. The reluctance motor rotor windings and stator windings may then be switched out of the power circuit of the hybrid PMSM motor 64 until the next start cycle for the hybrid PMSM motor 64.

In another exemplary embodiment, hybrid PMSM motor 64 may have a conventional induction rotor and associated stator windings instead of the reluctance rotor and windings. Induction rotor is mounted with PMSM rotor on the same frame and operated in substantially the same manner as described above to provide start-up torque and initiate rotation of the hybrid PMSM 60.

In a further exemplary embodiment of the hybrid PMSM 64, an IPM rotor 42 may be integrated with the reluctance rotor 36 or an inductance rotor, in the same manner as described above.

Figure 7:
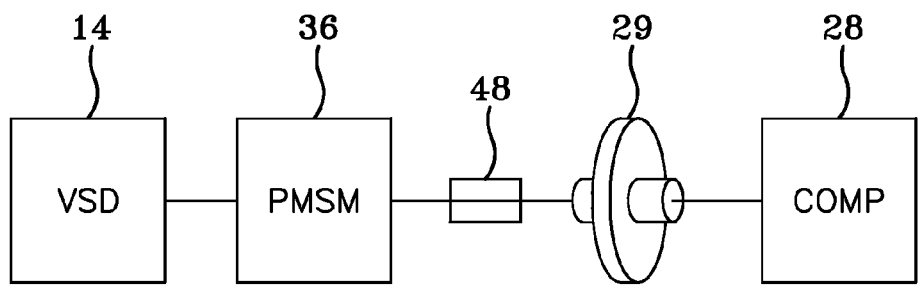
FIG. 7 shows a block diagram of a PMSM-driven system with reduced horsepower auxiliary starting motor.

Referring to FIG. 7, another exemplary embodiment of a PMSM-driven system may be implemented with a reduced horsepower starting motor 48. Starting motor 48 may be a conventional induction motor or any motor capable of developing sufficient torque to drive compressor from zero to about fifteen RPM, at which point PMSM 36 assumes driving control of compressor 28 under load. In order to reduce the starting torque required of starting motor 48, compressor 28 may be supported magnetically by magnetic bearings, thereby reducing the size of starting motor 48 necessary to begin compressor 28 rotation.

In an exemplary embodiment, a sensor-less starting method for PMSM 36 may be achieved by using a pneumatically actuated motor (not shown) powered by refrigerant gas from the HVAC&R system to initiate rotation of PMSM 36.

In another embodiment, a rotor alignment arrangement method may be employed with PMSM 36 for assuring a known position of rotor portion 20 at startup. When the rotor is at standstill, stator windings 21 are generally misaligned with permanent magnets 34 in rotor portion 20. Rotor poles and stator windings are randomly positioned before PMSM 36 is energized after the last operation of PMSM 36. In order to restart PMSM 36, the position of the rotor with respect to the stator needs to be known. Stator windings may then be energized to generate a magnetic field that rotates shaft 33 (FIG. 4) and rotor poles into magnetic alignment with stator windings 39. After energizing stator windings 39, rotor poles are aligned with stator poles in a predetermined position. Controller 40 then uses the position of rotor portion 20 to initiate rotation of PMSM 36 from a substantially known stationary position.

While only certain features and embodiments of the invention have been illustrated and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A vapor compression system comprising:
a compressor, a condenser and an evaporator connected in a closed refrigerant loop;
a motor connected to the compressor to power the compressor, the motor comprising:
a first rotor portion and a first stator portion configured as a permanent magnet motor;
a second rotor portion and a second stator portion configured as a reluctance motor, the second rotor portion comprising a reluctance-type rotor, and the second stator portion comprising electromagnetic windings capable of inducing a rotary magnetic field;
the first rotor portion and the second rotor portion attached to a common drive shaft of the compressor; and
a controller configured to operate the reluctance motor to generate start-up torque and initiate rotation of the drive shaft until the drive shaft achieves a predetermined rotational speed and to operate the permanent magnet motor to rotate the drive shaft between the predetermined rotational speed and a maximum rotational speed.

2. The system of claim 1, further comprising:
the first stator portion configured substantially similar to a stator of a conventional induction motor, the first stator portion comprising:
a plurality of windings disposed in corresponding slots, each slot defined by a pair of adjacent teeth symmetrically distributed about an inside radius of the first stator portion, the first rotor portion disposed axially concentrically with and inside the first stator portion, and first rotor portion and first stator portion separated by a first air gap;
first rotor portion further comprising a plurality of permanent magnets arranged to produce a magnetic field in the first air gap.

3. The system of claim 1, wherein the second rotor portion and second stator portion are configured to be controllably switched out of a power circuit of the motor.

4. The system of claim 2, wherein first rotor portion further comprises a rotor cage, and the plurality of permanent magnets are arranged peripherally on the rotor cage.

5. The system of claim 2, wherein the plurality of permanent magnets are arranged in multiple pole arrangements.

6. The system of claim 4, wherein the plurality of permanent magnets being adhesively affixed to the rotor cage, the plurality of the permanent magnets enveloped by a sleeve to maintain the plurality of permanent magnets on the rotor cage when centrifugal forces act on the rotor portion during rotation of the motor.

7. The system of claim 4, wherein the rotor cage is a cylindrical steel rotor cage.

8. The system of claim 6, wherein the sleeve portion comprises a flexible, high strength, magnetically non-permeable material.

9. The system of claim 8, wherein the material is carbon fiber tubular sheet material or stainless steel.

10. The system of claim 2, wherein a height of the first air gap is less than a height of an effective air gap, the effective air gap comprising a height of one of the plurality of permanent magnets and a thickness of the sleeve portion.

11. The system of claim 2, wherein at least a portion of the plurality of permanent magnets are implanted within an interior of first rotor portion.

12. The system of claim 1, wherein the controller is configured to control motor speed at any rotational speed in a speed range defined by the predetermined minimum speed and a maximum speed.

13. The system of claim 12, wherein the predetermined minimum speed is a speed at which the controller is capable of determining a magnetic flux along a q-axis and a d-axis without the need for an internal sensor mounted on one of the first or second rotor portions.

14. A hybrid motor for powering a compressor of a chiller system, the hybrid motor comprising:
a first rotor portion and a first stator portion configured as a permanent magnet motor;
a second rotor portion and a second stator portion configured as a reluctance motor, the second rotor portion comprising a reluctance-type rotor, and the second stator portion comprising electromagnetic windings capable of inducing a rotary magnetic field;
the first rotor portion and the second rotor portion attached to a common drive shaft; and
the reluctance motor being operated to generate start-up torque and initiate rotation of the drive shaft until the drive shaft achieves a predetermined rotational speed and the permanent magnet motor being operated to power the drive shaft between the predetermined rotational speed and a maximum rotational speed.

15. The hybrid motor of claim 14, further comprising:
the first stator portion configured substantially similar to a stator of a conventional induction motor, the first stator portion comprising:
a plurality of windings disposed in corresponding slots, each slot defined by a pair of adjacent teeth symmetrically distributed about an inside radius of the first stator portion, the first rotor portion disposed axially concentrically with and inside the first stator portion, and first rotor portion and first stator portion separated by a first air gap;
first rotor portion further comprising a plurality of permanent magnets arranged to produce a magnetic field in the first air gap.

16. The hybrid motor of claim 14, wherein the second rotor portion and second stator portion are configured to be controllably switched out of a power circuit of the hybrid motor.

17. The hybrid motor of claim 15, wherein first rotor portion further comprises a rotor cage, and the plurality of permanent magnets are arranged peripherally on the rotor cage; and the plurality of permanent magnets arranged in multiple pole arrangements on first rotor portion.

18. The hybrid motor of claim 17, wherein the plurality of permanent magnets being adhesively affixed to the rotor cage, the plurality of permanent magnets enveloped by a sleeve to maintain the plurality of permanent magnets on the rotor cage when centrifugal forces act on rotor portion during rotation of the hybrid motor; and wherein the sleeve comprises a flexible, high strength, magnetically non-permeable material.

19. The hybrid motor of claim 15, wherein at least a portion of the plurality of permanent magnets are implanted within an interior of first rotor portion.

20. The hybrid motor of claim 14, wherein the controller is configured to control the motor speed at any desired rotational speed in a speed range defined by a predetermined minimum speed and a maximum speed; the predetermined minimum speed defined as a speed at which the controller is capable of determining a magnetic flux along a q-axis and a d-axis without need for an internal sensor mounted on one of the first or second rotor portions.

21. The hybrid motor of claim 14, further comprising a flywheel attached to the common drive shaft to store rotational energy to provide ride-through energy in case of a momentary voltage sag or loss of power.

* * * * *